United States Patent [19]
Philpott

[11] Patent Number: 5,276,326
[45] Date of Patent: Jan. 4, 1994

[54] SCANNING RANGING RADIOMETER FOR WEATHER HAZARD SURVEILLANCE

[75] Inventor: Ian W. Philpott, Marion, Iowa

[73] Assignee: Rockwell International Corporation, Seal Beach, Calif.

[21] Appl. No.: 48,548

[22] Filed: Apr. 16, 1993

Related U.S. Application Data

[63] Continuation-in-part of Ser. No. 770,047, Sep. 30, 1991, abandoned.

[51] Int. Cl.$^5$ .................... G08B 23/00; G01J 5/06
[52] U.S. Cl. .................. 250/334; 250/338.5; 250/339; 250/347; 340/968
[58] Field of Search .............. 250/332, 334, 338.5, 250/339, 347; 73/178; 340/968

[56] References Cited

U.S. PATENT DOCUMENTS

| | | | |
|---|---|---|---|
| 3,359,557 | 12/1967 | Fow et al. | 343/100 |
| 3,380,055 | 4/1968 | Fow et al. | 343/100 |
| 3,465,339 | 9/1969 | Marner | 343/100 |
| 3,475,963 | 11/1969 | Astheimer | 73/355 |
| 3,641,345 | 2/1972 | Coackley et al. | 250/338.5 X |
| 3,665,467 | 5/1972 | Haroules et al. | 343/100 |
| 3,777,270 | 12/1973 | Hardy et al. | 325/363 |
| 3,780,293 | 12/1973 | Flint | 250/339 |
| 3,935,460 | 1/1976 | Flint | 250/349 |
| 4,043,194 | 8/1977 | Tanner | 340/968 X |
| 4,342,912 | 8/1982 | Adamson | 250/339 |
| 4,719,350 | 1/1988 | Alm | 250/334 X |
| 4,926,051 | 5/1990 | Turnbull | 250/332 |
| 4,931,648 | 5/1990 | Elliott et al. | 250/370.10 |
| 4,933,555 | 6/1990 | Smith | 250/330 |
| 4,937,447 | 6/1990 | Barrett | 250/339 |
| 4,965,573 | 10/1990 | Gallagher et al. | 340/968 |
| 5,105,191 | 4/1992 | Keedy | 340/968 |

OTHER PUBLICATIONS

Product Brochure, "Introducing An Airborne Infrared System That Provides Advance Warning Of Windshear And Clear Air Turbulence", Distributed by DAC.

Peter C. Sinclair, Peter M. Kuhn, "Aircraft Low Altitude Wind Shear Detection and Warning System", Journal of Applied Meteorology, vol. 30 No. 1 Jan. 1991, pp. 3-16.

Fred H. Proctor, "A Relationship Between Peak Temperature Drop and Velocity Differential In A Microburst, Preprint Volume of the Third Intl. Conference On Aviation Weather System", Jan. 30–Feb. 3, 1989 by American Meteorological Society, Boston, Mass.

Donald S. Foster, "Thunderstorm Gusts Compared With Computed Downdraft Speeds", Monthly Weather Review, Severe Local Storms Forecast Center, U.S. Weather Bureau, Kansas City, Mo. Manuscript received Oct. 4, 1957, pp. 91-94.

P. M. Kuhn, R. L. Kurkowski, "Airborne Infrared Low–Altitude Wind Shear Detection Test", Journal of Aircraft, vol. 21, No. 10, Oct. 1984, p. 792, American Institute Of Aeronautics and Astronautics.

E. Fawbush, R. Miller, "A Basis for Forecasting Peak Wind Gusts in Non–Frontal Thunderstorms", Bulletin American Meteorological Society, vol. 35, No. 1, 1954, pp. 14-19.

*Primary Examiner*—Constantine Hannaher
*Assistant Examiner*—Edward J. Glick
*Attorney, Agent, or Firm*—Gregory G. Williams; M. Lee Murrah; H. Frederick Hamann

[57] ABSTRACT

An advance in-flight windshear detection system which utilizes a scanning mirror to direct infrared energy located in a three dimensional space in front of the aircraft which is divided into a plurality of variable columns, onto a linear array of photoconductive infrared detectors, the detector emitting a signal representative of the radiant energy at various points in said variable located columns, and a computer for generating a displayable representation of the air temperature in front of the aircraft, the computer further capable of interpolating and extrapolating the air temperatures in the three dimensional space based upon the known and or calculated lapse rate; and a display device for graphically displaying the air temperature in front of the aircraft and above the flight path vector so as to provide a more accurate indication of windshear which is less affected by the uncertainties arising from measuring air temperature in a typically more turbulent region along the flight path vector as the aircraft approaches the ground.

7 Claims, 6 Drawing Sheets

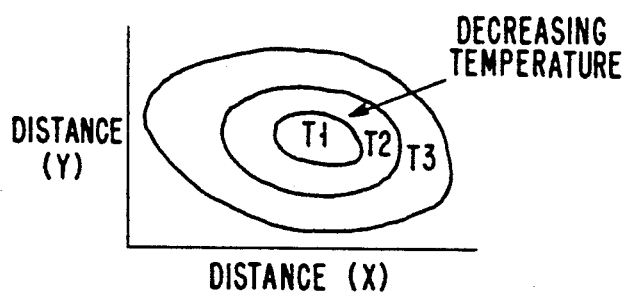
FIG. 4
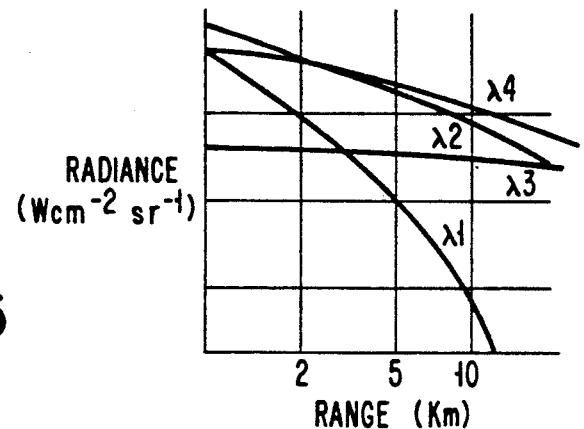
FIG. 5
| WAVELENGTH | RADIANCE |
|---|---|
| $\lambda_1$ | $R_1$ |
| $\lambda_2$ | $R_2$ |
| $\lambda_3$ | $R_3$ |
| $\lambda_4$ | $R_4$ |
FIG. 6
FIG. 7
| RANGE | TEMPERATURE |
|---|---|
| $X_1$ | $T_1$ |
| $X_2$ | $T_2$ |
| $X_3$ | $X_3$ |
| $X_4$ | $X_4$ |

SCANNING RANGING RADIOMETER FOR WEATHER HAZARD SURVEILLANCE

This application is a continuation-in-part of application Ser. No. 07/770,047 filed Sep. 30, 1991, now abandoned.

FIELD OF THE INVENTION

This present invention generally relates to windshear detection systems and more particularly to the advance in-flight detection of weather hazardous to aircraft.

BACKGROUND OF THE INVENTION

Low level windshear is a major aircraft safety hazard, particularly for large swept wing commercial jets. Windshear is a weather condition which results in a rapidly changing airflow over the lift surfaces of the aircraft. Should the forward velocity of the air over the lift surfaces suddenly decrease, the lift will decrease. Hence, an aircraft may experience a forced descent due to the down flowing air mass and also by an apparent loss in forward air speed. Such conditions are typical of a low level windshear.

Ample evidence now exists to substantiate the causal relationship between low altitude windshear (LAWS) and the increase in low altitude aircraft accidents on approach and take-off. It is thus desirable that an onboard aircraft system be available for advanced detection of LAWS giving the pilot at least one minute advanced warning of hazards ahead.

Previously, windshear detection systems have been devised to detect the presence of windshear by using combinations of vertical and horizontal accelerations of the aircraft, air speed and other measurements. The deficiency of that system is that the windshear must be encountered by the aircraft before a warning is given to the flight crew, that is, the systems are reactive in nature. In addition, such systems are unaware of the general atmospheric conditions ahead of the aircraft.

Another windshear detection system that has been used in the past, utilizes a forward looking infrared radiometer to measure the temperature of the air in the extended flight path of the aircraft. This detects the infrared radiation from air and water vapor in front of the aircraft and along its current flight path vector. While this type of system is receiving some use today, it does have some drawbacks. One problem is that at low altitude, the air, especially in a wind shear, is turbulent which makes it difficult to measure a coherent temperature pattern.

Consequently, the development of airborne low level windshear detection system is of considerable value to commercial, corporate and military aircraft.

SUMMARY OF THE INVENTION

It is an object of the present invention to provide advanced warning of windshear.

It is a feature of the present invention to include a scanning ranging radiometer.

It is a advantage of the present invention to determine temperature in a three dimensional space in front of the aircraft.

It is another object of the present invention to provide advanced warning of windshear by a visual display of air temperatures to the flight crew.

It is another feature of the present invention to provide method and means for interpolating and extrapolating air temperatures.

It is another advantage of the present invention to provide a smooth display of air temperatures of the three dimensional space in front of the aircraft.

The present invention provides a system for advance in-flight detection of weather hazardous to an aircraft which is designed to satisfy the aforementioned needs, produce the earlier propounded objects, include the above described features and achieve the already articulated advantages. The invention is carried out in a "low level turbulence-less" system in the sense that the low level air turbulence, typically associated with a low level windshear, is not a major detrimental factor in displaying the air temperature in front of the aircraft.

Instead, a three dimensional observable space, in front of the aircraft and significally above the ground, is sequentially scanned in incremental strips using a scanning ranging radiometer, in order to determine the air temperatures in the observable space.

Accordingly, the present invention provides an improved windshear detection system which includes a means for scanning a ranging radiometer in both horizontal and vertical directions and thereby collecting IR energy representative of the air temperature, means for determining the air temperature in the observable space in response to signals output from the scanning radiometer, and means for displaying the temperature of the air in front of the aircraft in response to the means determining the air temperature, and in a preferred embodiment interpolating and exterpolating between measured temperature points by using a lapse rate calculation.

BRIEF DESCRIPTION OF THE DRAWINGS

The invention may be more fully understood by reading the following description of a preferred embodiment of the invention in conjunction with the appended drawings wherein;

FIG. 4 is a representation of a display screen in a planned position indicator.

FIG. 5 is a graph of curves representing received radiance due to a source at range x for a given wavelength.

FIG. 6 is a table showing measured radiance against wavelength in the domain of the observable space.

FIG. 7 is a table representing the result from inversion of data from FIG. 6 for one look angle.

DETAILED DESCRIPTION

Figure 1:
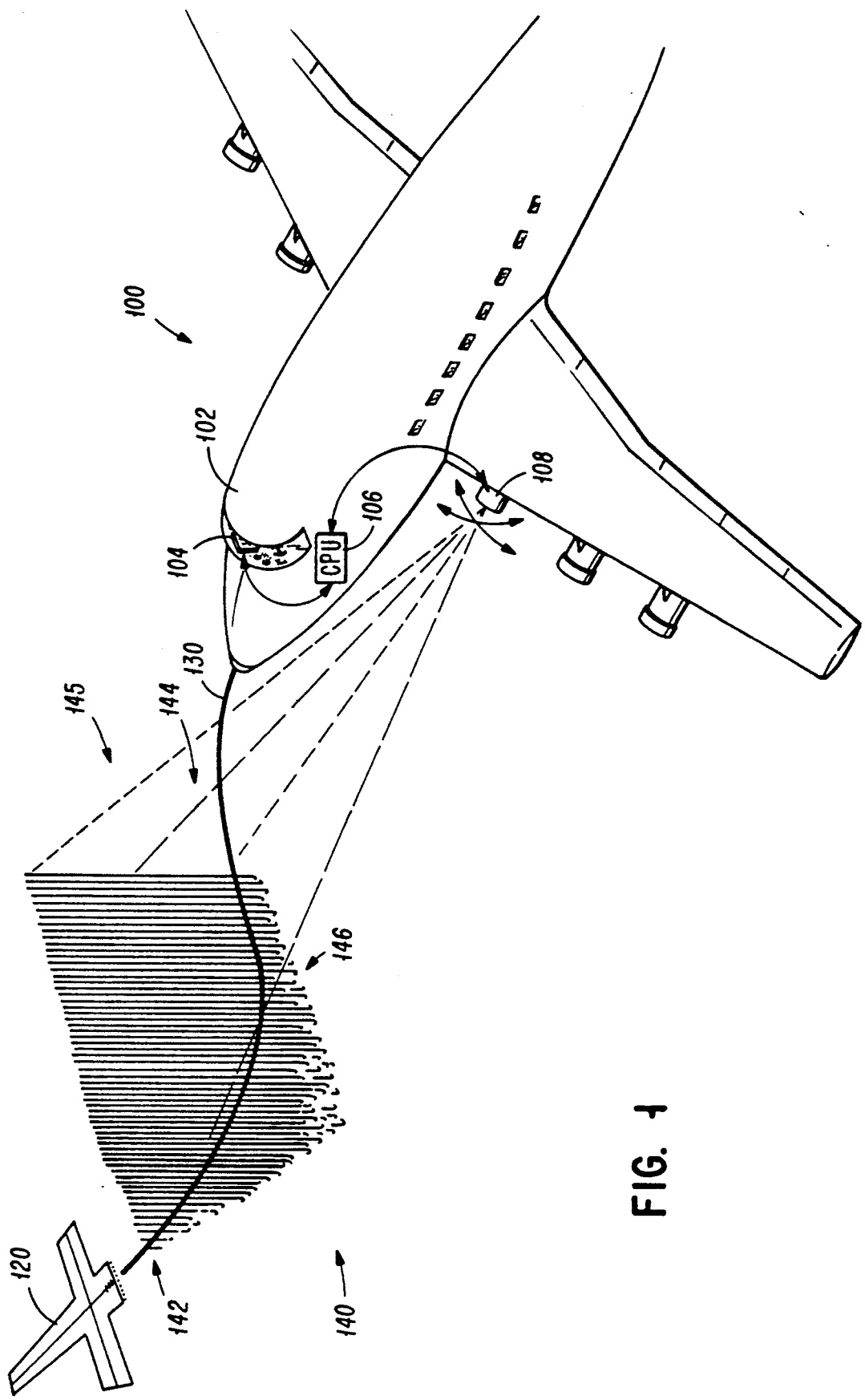
FIG. 1 is a perspective view of an aircraft, equipped with the improved windshear detection system of the present invention, approaching an airport with a microburst existing in the glide path.

Now referring to FIG. 1, there is shown an aircraft, generally designated 100, having a display device 104 disposed within the cockpit 102. Display device 104 is coupled with CPU 106 and infrared pod 108. Pilot 110 views the display 104 which provides a pictorial representation of the air temperature in a space in front of the aircraft. (see FIG. 4)

Aircraft 100 is shown descending toward an airport 120 along a glideslope 130. Also shown is a microburst or windshear 140 disposed in relatively calm air 142. Microburst 140 is shown having a relatively uniform downburst at its higher altitudes 144 and a more turbulent lower level section 146 at ground level or near ground level. Glideslope 130 extends through the lower section 146 of windshear 140.

IR pod is shown scanning a vertical angle $\alpha$ and a horizontal angle $\beta$ and moreover is shown directed toward an observable space 145 which is substantially above the ground level. (note: that the observable space 145 is preferrably the sum of a sequence of temperatures profile slices coincident with the upper portion of the microburst 144 and thereby is scanning a region of relatively uniform down airflow.)

Prior art windshear detection systems which used infrared radiometers have typically determined the air temperature along the glideslope and have not scanned a wide area above the ground. This turbulent area makes it difficult to present a coherent temperature graph to the flight crew. The present invention provides an improved warning system by displaying a coherent display of a down draft aloft which is representative of LLWS.

Figure 2:
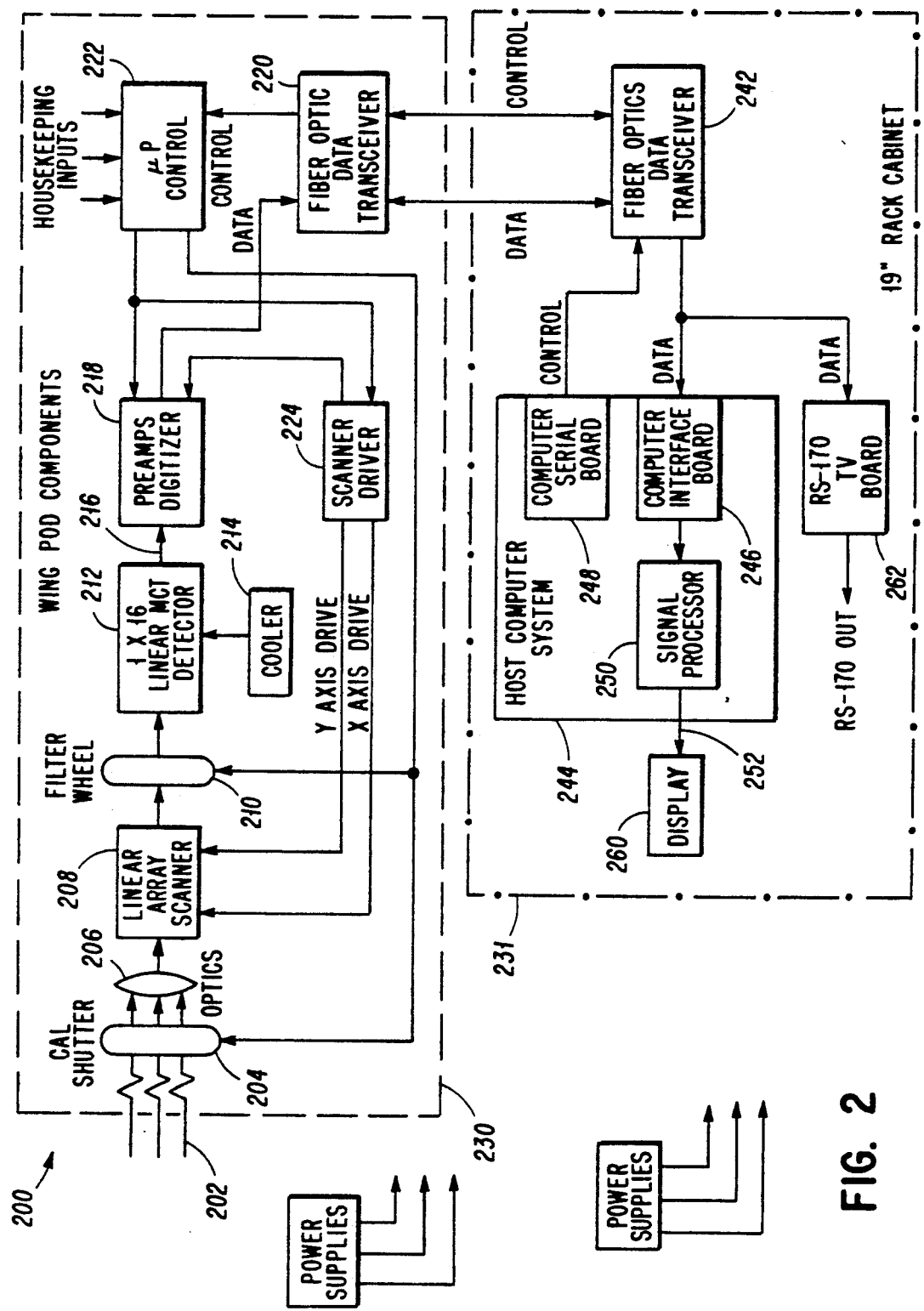
FIG. 2 is a block diagram of the scanning ranging radiometer system of the present invention showing the components of the wing pod, the rack cabinet and the display device.

Now referring to FIG. 2, there is shown an infrared radiometer system, of the present invention, generally designated 200. The contents of the dashed circle 230 represents that portion of the system 200 which is preferrably located in a wing pod or in the nose of the aircraft and represent the means for collecting IR energy in an observable space in front of the aircraft. The contents of dashed and dotted circle 231 is preferrably located in the cockpit or other locations within the fuselage. Section 231 represents the means for determining a temperature from the received energy and means for displaying the temperature.

Also shown in more detail is infrared energy 202 incident upon a cal shutter 204 which is preferrably a computer controlled small black shutter. Preferrably the temperature of the shutter 204 is monitored and sent to the host computer so that calibration can be obtained on a frame by frame basis. The infrared energy 202 may pass through the shutter 204 and is then incident upon an objective lens 206 which focuses the energy onto a linear scanner 208. Linear scanner 208 is preferrably a computer controlled scanning mirror which selectively directs the incident IR energy 202 toward a filter wheel 210 which is preferrably an array of various filters for passing only certain predetermined narrow bands of IR energy. Filter 210 is preferably a computer controlled device which is operated by a stepping motor (not shown) so that the filter wheel can be rotated and thereby allowing for various filter elements to be exposed to the IR energy 202, which is then incident upon the detector 212 which is preferably a 1×16 array of photo-conductive mercury cadmium telluride (HgCdTe) IR detectors. Coupled with detector 212 is a cooler 214 which is used to cool the detector to its preferred operating temperature of 77° K. Output from the detector 212 is a signal 216 which corresponds to the IR energy 202 which passes through the filter wheel 210. Signal 216 is amplified and digitized by preamp digitizer 218 and is then provided to fiber optic data transceiver 220. Microprocessor control 222 is shown receiving housekeeping inputs and providing control outputs to the preamp digitizer 218, the scanner driver 224 which drives the linear array scanner 208, and further providing signals to the cal shutter 204 and the filter wheel 210. The data output from the preamp digitizer 218 which is provided to the fiber optic data transceiver 220 is then transmitted, preferrably by fiber optic means to a second fiber optic data transceiver 242 which is located in the cockpit or fuselage of the aircraft. Fiber optic data transceiver 242 provides data to the host computer system 244 which includes a computer interface board 246 a computer serial board 248 and a signal processor 250. Output from signal processor 250 is a video display signal 252 which is directed to display device 260 which is located in the cockpit and is viewable by the flight crew. Also output from the fiber optic data transceiver 242 is data provided to the RS-170 TV board 262 which provides a standard RS-170 output.

Figure 3:
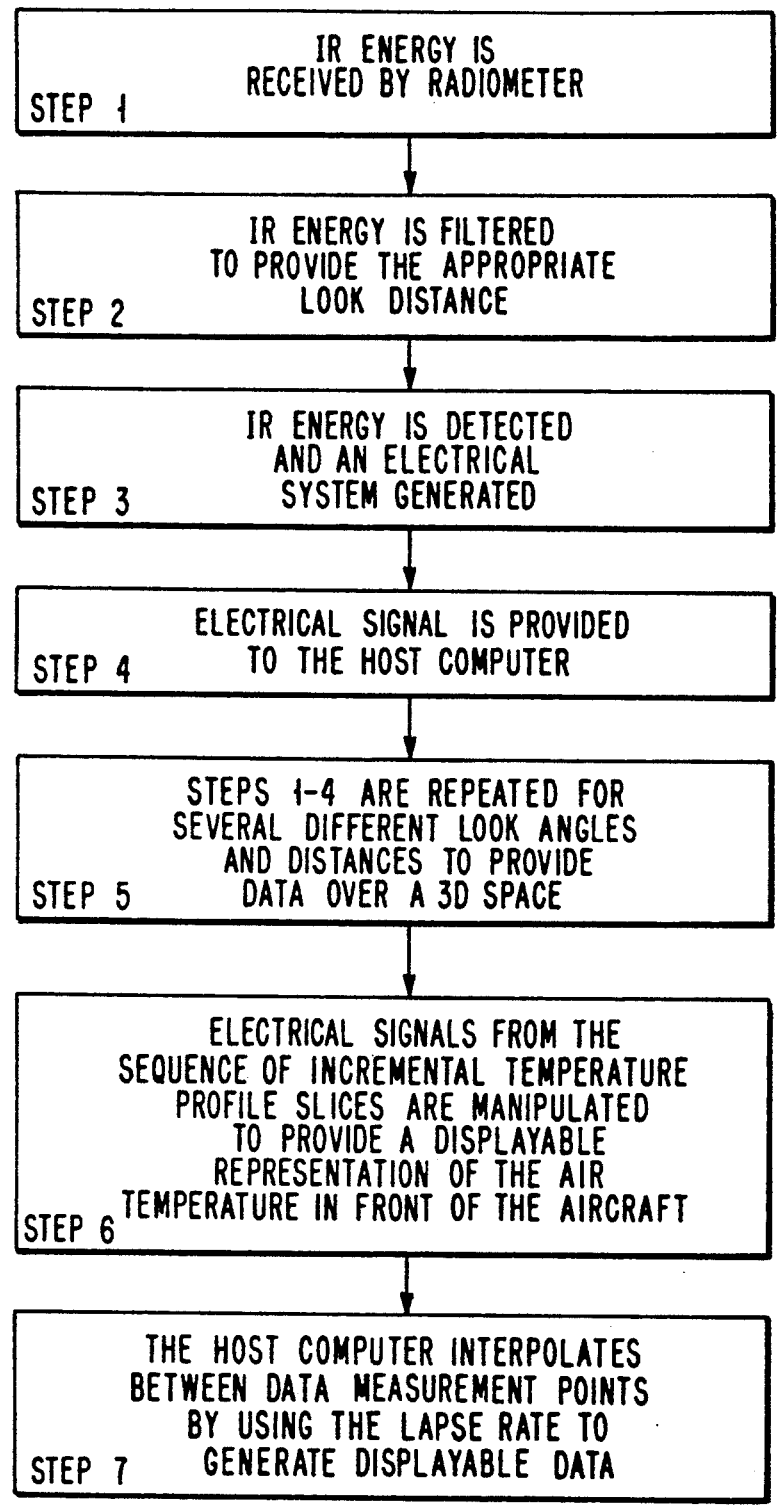
FIG. 3 is a flow-chart of the present invention showing the operating sequence of the apparatus and method of the present invention.
Figure 8:
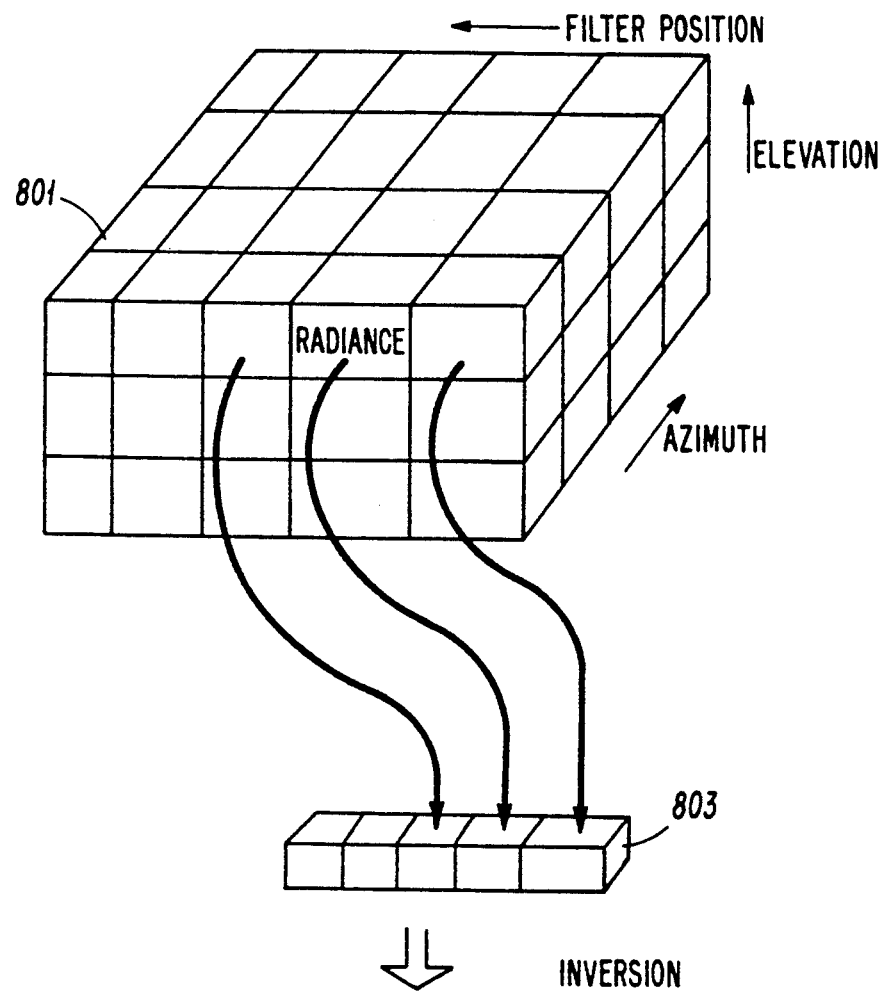
FIG. 8 is a pictorial representation of portions of the operation sequence of the apparatus and method of the present invention.
Figure 8:
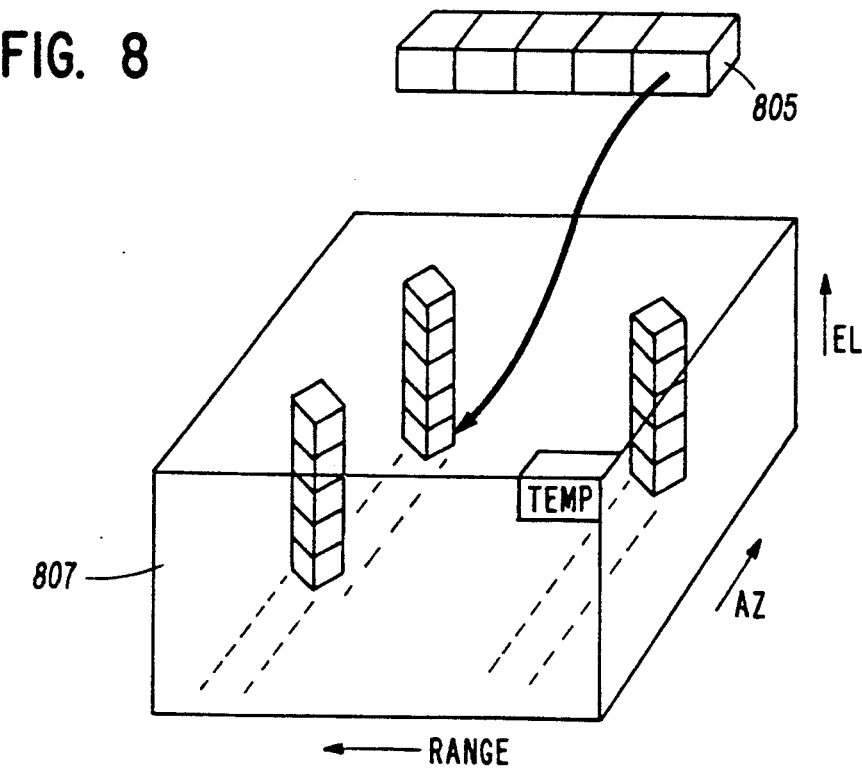

In operation, and now referring to FIG. 3, FIG. 2 and FIG. 8 Step 1. Infrared energy is incident upon the radiometer. The energy 202 arriving at the sensor from the chosen direction determined by the optics 206 and the scanner 208 incident on the detector 212 is measured. Step 2. The IR energy is filtered by a predetermined and selectively changeable filter, thereby selecting a predetermined wavelength, and look distance. The energy is filtered by the filter 210 before being passed to the detector 212. Step 3. The IR energy is then detected by a linear detector 212 which provides an electronic signal corresponding to the radiance or i.e. intensity of the IR energy from a narrow slice of the observable space. Step 4. The electrical signal is then provided to the host computer system 244. The host computer 244 assembles a data record which is a measure of the incident IR energy, filter position and scanner positions. A unique record for that combination is store. Step 5. The host computer 244 determines a new filter position based on a predetermined pattern. The host computer assembles a new record per Step 4 and stores it. When the predetermined number of records for the required filter wheel positions have been store, the computer calculates a new look angle in azimuth and or elevation. The optics and scanner are directed to the new position. The computer takes measurements and stores those records corresponding to the number of filter wheel positions. At the completion of all required azimuth and elevation positions the computer will have stored a 3 dimensional array 801 (FIG. 8) of records.

The 1st dimension corresponds to the number of filter wheel positions.

The 2nd dimension corresponds to the number of azimuth positions.

the 3rd dimension corresponds to the number of elevation positions.

(See FIG. 8) Note the array must be assembled in any order. Step 6. It is in host computer 244 that the raw data from a sequence of temperature profile slices each at a predetermined look angle and elevation is manipulated in order to form a displayable representation of the air temperature in an observable space in front of the aircraft. Numerical data is taken from the above 3 dimensional array and assembled into a single dimensional array (a radiance vector 803). For a chosen azimuth and elevation the measurement corresponding the first filter wheel position is placed at vector position 1. The measurement taken corresponding to the second filter wheel position is placed at vector location 2. This is repeated until the measurements made at the chosen azimuth and elevation have been assembled into the vector 803 (FIG. 8). The assembled data vector 803 is known as the radiance data.

The vector 803 is manipulated by a mathematical transformation known as inversion. (The procedure is discussed by Westwater and Strand). The inversion process converts the radiance and wavelength data to temperature and range data. The inverted radiance data now represents the temperature profile for that azimuth and elevation. The data in temperature vector 805 position 1 represents the temperature at some range 1, distance from the instrument. The data in vector position 2 represents the temperature at range 2 distant from the instrument. Thus the temperature has been determined at a number of range points in space. This process is repeated throughout the original three dimensional array 801 thus generating a new three dimensional array 907 of temperatures against azimuths, elevations and ranges. Step 7. The host computer system manipulates the incoming data and further interpolates between data points in the observable space by generating interpolated values in accordance with the theory of operation discussed below. A comprehensive three dimensional array of air temperature data points is then provided to the display device 260. This comprehensive three dimensional array of temperature can be analyzed in an infinite number of ways. One particular way of analyzing or using the 3D temperature array is to divide the observable space into at least three vertical columns of air with each column having at least three measured data points and numerous interpolated data points. These at least three vertical columns preferrably vertical columns having at least 3 different ranges (distances from the aircraft).

THEORY OF OPERATION

While not wishing to be bound by theory the following information is provided to better enable one to make, use and understand what the applicant presently believes is the best mode of carrying out the invention.

The basis for an infrared temperature sensing wind shear predictor system is the demonstrated relationship between the temperature gradient across a shear-producing gust front or downburst outflow and the wind speed associated with the outflow. An article entitled "A Basis for Forecasting peak Wind Gusts in Non-Frontal Thunderstorms" by Fawbush and Miller, which was published by Bulletin American Meteorological Society in 1954; an article entitled "Thunderstorm Gusts Compared With Computed Downdraft Speeds" by Foster, which was published by Monthly Weather Review in 1958; and an article entitled "A Relationship Between Peak Temperature Drop And Velocity Differential In A Microburst" by Proctor, which was published by American Meteorological Society in 1989 have provided a physical basis for predicting peak gusts caused by thunderstorm densities, temperature currents, temperature gradients. Temperature drops of 5° centigrade may readily accompany peak gusts of 17 meters per second while those of 15° centigrade maybe associated with peak gusts of approximately 40 meters per second. The instrument to measure the temperature of the atmosphere remotely is typically known as a radiometer. In order to obtain ranging information the radiometric intensity is measured close to an absorption line in the atmosphere. The sensor measures the radiation emitted from gases whose distribution is well known, such as carbon dioxide or molecular oxygen, then the radiance can be used to derive the temperature.

To get a good temperature profile the absorption band should have the following properties: The emitting constituent preferrably should have a known mixing ratio and be uniformly mixed in the atmosphere. Molecular oxygen and carbon dioxide may satisfy these requirements up to 100 km. They have absorption bands of 60 GHZ for oxygen and 15 $\mu$m and 4.3 $\mu$m infrared for carbon dioxide.

The instrument exploits $CO_2$ infrared absorption and re-emission in the 13 $\mu$m to 16 $\mu$m region. The instrument of the present invention has a cryogenically cooled mercury cadmium telluride linear array in the scanning mode with multiple spectral filters to cover the 8 $\mu$m to 12 $\mu$m transmission band as well as the 13 $\mu$m to 16 $\mu$m $CO_2$ absorption band.

Carbon Dioxide ($CO_2$) is typically uniformly present in the atmosphere of the earth and it is well know to cause strong absorption of infrared radiation in the 13 $\mu$m to 16 $\mu$m and other spectral regions. It has been demonstrated (Flint, 1968; Kuhn et al, 1983 and 1984) that observations of air turbulence can be made with an infrared radiometer utilizing this $CO_2$ absorption band. If observations are made, assuming a constant air temperature, through a filter centered at 13 $\mu$m, the air mass is mostly transparent and the received radiation is mainly due transmission from the background and the air mass of a relatively long "look distance". If observations are made through a filter centered near 15 $\mu$m, then the air mass may become completely opaque and allowing zero "look distance". This way, changing the variable filter's center wavelength between 13 $\mu$m and 15$\mu$, different "look distances" can be achieved corresponding to the filter's changing spectral peak.

Air turbulence such as LAWS and CAT are known to show significant temperature variations in the atmosphere. The infrared radiometer can readily detect the temperature changes and, with a variable spectral filter allowing different "look distance", it can indicate the range of the air turbulence occurrence.

Based on the report by Kuhn, et al, the infrared radiation received by a sensor due to the $CO_2$ in the air can be expressed as:

$$N = \int_v \int_x B(v, T)\psi(v) \frac{\delta\tau\Delta v(u[CO_2])}{\delta x} dx dv \quad (1)$$

In Eq. (1), the horizontal transmission may be expressed as:

$$\tau_{\Delta v} = \exp(-k_{\Delta v} q \rho \chi) \quad (2)$$

where the product, $q\rho$, is the density of carbon dioxide gas. The weighting function in Eq. (1) is given by $\delta\tau\Delta v/\delta\chi$ as a function of the horizontal path distance, x.

Shown in FIG. 5, are curves representing radiometric calculations for a sample air turbulence of certain dimensions, with a variable filter centered at 4 spectral peaks. For example at an altitude of 1 km, an air mass of 1 km thickness with a temperature difference of 4° C. at a range of 5 km, the radiance difference was calculated as $10^{-7}$ W cm$^{-2}$ sr$^{-1}$ with the filter centered at 14.0 μm.

The received radiance through any filter is composed of overlapping region, some energy from closer than the prescribed "look distance", some energy from further than the prescribed "look distance". The process of resolving the overlapping energy peaks is known as inversion.

The concept of inversion is as follows and is discussed in an article entitled "A generalized inversion program" by Ed R. Westwater and Otto Neall Strand, in the November 1974 National Oceanic Atmosphere Administration Tech Report ERL 309-WPL 34. Suppose that we measure a finite set $\{G|g_1, g_2, g_i, \ldots g_n|\}$ of N observables and find the data $\{\Gamma|\gamma_1, \gamma_2, \gamma_i, \ldots \gamma_n|\}$ (FIG. 6.) If the measurements are without error and the system is noise free then if $M_T$ represents the model corresponding to the atmosphere then:

$$\lambda = g(M_T)$$

Here g(M) symbolizes the function defining the observable. The inversion requires $M_T$ to be determined from T as accurately as possible.

After the inversion the reality space is now determined as shown in FIG. 7. The table represents one look angle. To determine the lapse rate at a given range, the measurement and inversion process is repeated at a number of different look angle elevations. Simple geometry yields the lapse rate $\delta T/\delta H$ at a given range.

Having obtained the temperature profile for a particular look angle and elevation, the data is displayable by an instrument to display temperature, which could be the temperature at a given altitude determined from the measured lapse rate and interpolated at the altitude against range and azimuth from the observer. (See FIG. 4) It is contemplated that once the data has been gathered other display format may be used. FIG. 4 is just an example of many formats. The ultimate decision may be one of pilot preference or industry standard. Such an instrument is used to provide advanced warning of descending columns of cold air or downbursts that would make the penetration of such an event dangerous for an aircraft.

Figure 9:
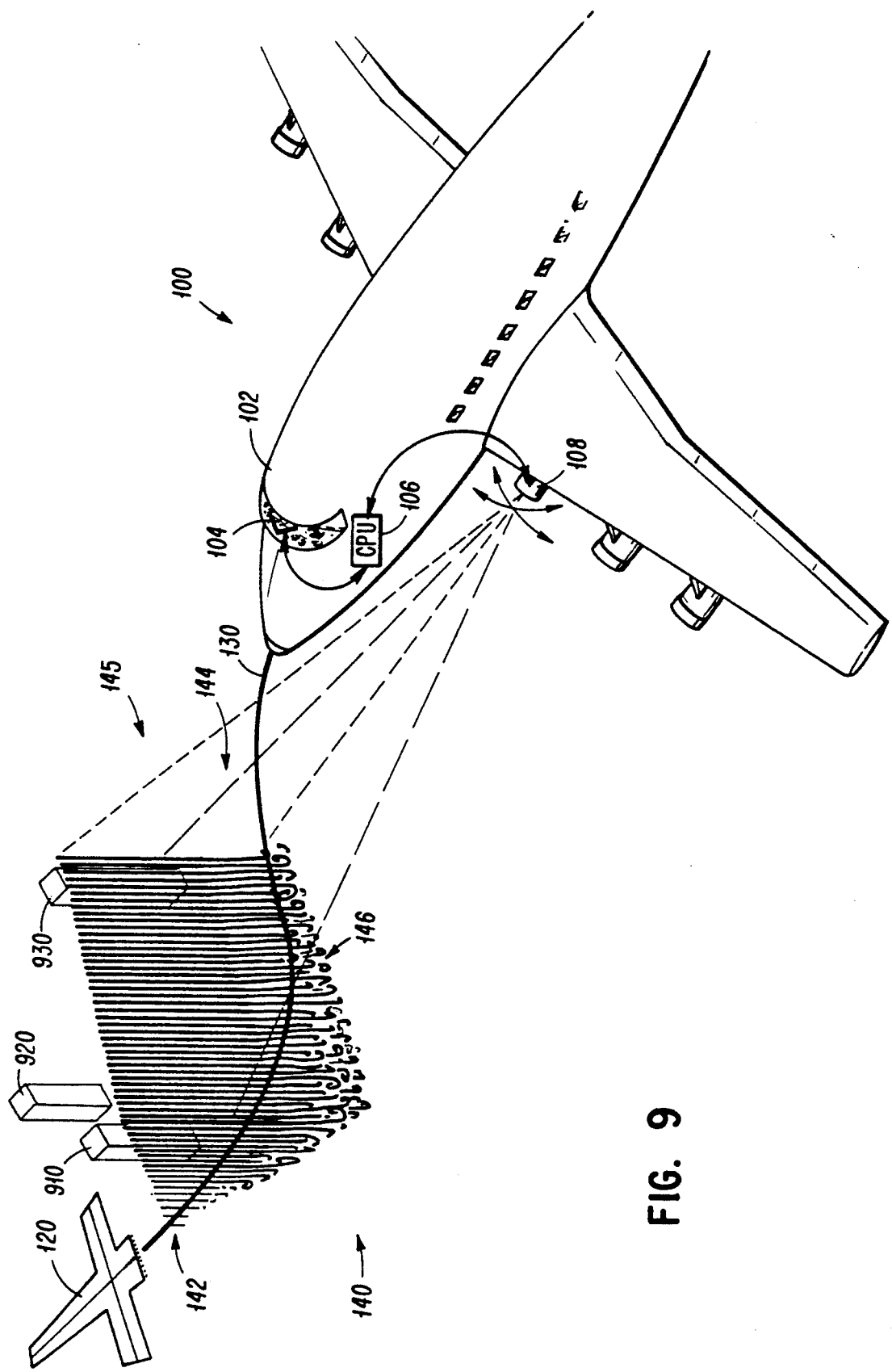
FIG. 9 is a perspective view of an aircraft as shown in FIG. 1 but with three columns of air in front of the aircraft and above the flight path vector being measured for temperature gradients and therefore microbursts.

In summary, and now referring to FIG. 9 the apparatus and method of the present invention as described above are used to determine the temperature gradients in at least three columns of air 910, 920, and 930 above the slide stop or flight path vector 130 and located in the less turbulent region 142 above the more turbulent region 146. These columns 910, 920 and 930 are used to avoid the inaccuracies that may result from analyzing more turbulent air 146. If columns 910, 920, and 930 indicate relatively large temperature gradients a windshear is possible below such columns.

While particular embodiments of the present invention have been shown and described, it should be clear that changes and modifications may be made to such embodiments without departing from the true scope and spirit of the invention. It is intended that the appended claims cover all such changes and modifications.

I claim:

1. An advance windshear detection system for use on an aircraft having a flight path vector, the system comprising:
    a microprocessor controller linear array scanner, positioned at a first predetermined location on the aircraft, for directing infrared energy incident thereon from a series of at least three variably located columns of atmosphere in front of the aircraft and above the flight path vector to a second predetermined location within the aircraft, said at least three variably located columns of atmosphere being from at least three different distances in front of the aircraft;
    an infrared energy detector, located at said second predetermined location in said aircraft, for generating a first electrical signal in response to the infrared energy incident thereon;
    a microprocessor controlled variable filter disposed at a third predetermined location in the aircraft, said third predetermined location being located between said first predetermined location and said second predetermined location;
    a microprocessor, electrically coupled with said linear array scanner and said variable filter, for providing scanning control signals to said linear array scanner and for further providing filter selection signals to said variable filter;
    a computer means for generating a second electrical signal in response to said first electrical signal, wherein said second electrical signal is representative of the air temperature in said series of at least three variably located columns of atmosphere; and,
    a display device, coupled with said computer means, for displaying a graphic representation of the air temperature in said series of at least three variably located columns of atmosphere.

2. A windshear detection system of claim 1, wherein said linear array scanner is a mirror coupled with a drive mechanism for manipulating the mirror in an X direction and a Y direction.

3. A system of claim 2, wherein said variable filter is an assembly of a plurality of filters with each of said plurality alternately positionable at said third predetermined location.

4. A system of claim 3, wherein said assembly of a plurality of filters is a filter wheel.

5. A windshear detection system of claim 1, wherein said detector is a linear array of photoconductive infrared detectors.

6. A windshear detection system of claim 5, wherein said linear array of photoconductive infrared detectors is a 1 ×16 array of HgCdTe infrared detectors.

7. An advance windshear detection system for use on an aircraft, having a flight path vector, the system comprising:
    a microprocessor controlled drive mechanism coupled with a mirror, together located at a first predetermined location in the aircraft, for directing infrared energy incident thereon from a series of at least three variably located columns of atmosphere in front of the aircraft and above the flight path vector to a second predetermined location within the aircraft, said at least three variably located columns of atmosphere being from at least three different distances in front of the aircraft;
    a 1 ×16 array of HgCdTe infrared detectors, located at said second predetermined location in the aircraft, for generating a first electrical signal in response to the infrared energy incident thereon;

a filter wheel disposed at a third predetermined location in the aircraft, said third predetermined location being located between said first predetermined location and said second predetermined location, said filter wheel including a plurality of individual filters for passing predetermined wavelengths of infrared energy incident thereon;

a microprocessor, electrically coupled with said drive mechanism and said filter wheel, for selectively positioning said mirror and said filter wheel;

a computer means for generating a second electrical signal in response to said first electrical signal, wherein said second electrical signal is representative of the air temperature in said series of at least three variably located columns of atmosphere; and, a display device, coupled with said computer means, for displaying a graphic representation of the air temperature in said series of at least three variably located columns of atmosphere.

* * * * *